United States Patent
Zeng et al.

(10) Patent No.: US 9,926,780 B2
(45) Date of Patent: Mar. 27, 2018

(54) MICRO-STRUCTURED FIBER OPTIC CABLE FOR DOWNHOLE SENSING

(71) Applicant: Halliburton Energy Services, Inc., Houston, TX (US)

(72) Inventors: Yong Zeng, Spring, TX (US); William Schaecher, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/315,831

(22) PCT Filed: Jul. 30, 2015

(86) PCT No.: PCT/US2015/042902
§ 371 (c)(1),
(2) Date: Dec. 2, 2016

(87) PCT Pub. No.: WO2017/019089
PCT Pub. Date: Feb. 2, 2017

(65) Prior Publication Data
US 2017/0183958 A1 Jun. 29, 2017

(51) Int. Cl.
*G01V 3/00* (2006.01)
*E21B 47/12* (2012.01)
(Continued)

(52) U.S. Cl.
CPC .............. *E21B 47/123* (2013.01); *G01V 8/16* (2013.01); *H04B 10/25* (2013.01); *H04B 10/516* (2013.01)

(58) Field of Classification Search
CPC .................................................. E21B 47/123
(Continued)

(56) References Cited

U.S. PATENT DOCUMENTS

| 5,644,667 A | 7/1997 | Tabuchi |
| 7,696,901 B2* | 4/2010 | Wilson .................. E21B 47/123 340/854.3 |

(Continued)

FOREIGN PATENT DOCUMENTS

WO    2014/018010 A1    1/2014

OTHER PUBLICATIONS

International Search Report and Written Opinion issued in related PCT Application No. PCT/US2015/042902 dated May 26, 2016, 14 pages.
(Continued)

*Primary Examiner* — Santiago Garcia
(74) *Attorney, Agent, or Firm* — Benjamin Fite; Baker Botts L.L.P.

(57) ABSTRACT

In accordance with embodiments of the present disclosure, systems and methods for sensing and communicating sensed downhole parameters using a hybrid micro-structured fiber optic cable are provided. The micro-structured fiber optic cable may be used to communicate and/or amplify sensor signals indicative of the sensed downhole parameters. These sensed downhole parameters may include one or more of a downhole temperature, pressure, magnetic field, electromagnetic energy, radioactivity, telemetry signal, or some other downhole measurement. The micro-structured fiber optic cable may include opto-electronic circuitry built into the internal structure of the cable for modulating the optical signal based on the sensed parameters. The opto-electronic circuitry may include diodes, triodes, and other components that are communicatively coupled to external sensors used to measure downhole parameters. The opto-electronic circuitry may include an internal sensor in the form of a functional material disposed within the micro-structured fiber optic cable for measuring downhole parameters.

21 Claims, 6 Drawing Sheets

(51) Int. Cl.
*H04B 10/516* (2013.01)
*H04B 10/25* (2013.01)
*G01V 8/16* (2006.01)

(58) Field of Classification Search
USPC .................................................. 340/854.7
See application file for complete search history.

(56) References Cited

U.S. PATENT DOCUMENTS

| | | | | |
|---|---|---|---|---|
| 9,255,836 | B2* | 2/2016 | Taverner | G01H 9/004 |
| 9,322,702 | B2* | 4/2016 | Lumens | G01H 9/004 |
| 2007/0062696 | A1* | 3/2007 | Wilson | E21B 47/123 |
| | | | | 166/254.2 |
| 2008/0138022 | A1 | 6/2008 | Tassone | |
| 2010/0066560 | A1* | 3/2010 | McDaniel | E21B 43/267 |
| | | | | 340/854.9 |
| 2012/0111104 | A1* | 5/2012 | Taverner | G01H 9/004 |
| | | | | 73/152.16 |
| 2012/0237205 | A1* | 9/2012 | Duncan | E21B 47/0006 |
| | | | | 398/25 |
| 2013/0026355 | A1* | 1/2013 | Climent | G01T 3/08 |
| | | | | 250/265 |
| 2015/0021009 | A1* | 1/2015 | Skinner | E21B 47/00 |
| | | | | 166/66 |
| 2016/0208603 | A1* | 7/2016 | Barfoot | E21B 47/123 |
| 2016/0209584 | A1* | 7/2016 | Vincelette | B23K 20/10 |

OTHER PUBLICATIONS

Micco, A., et al. "Simple technique for integrating compact silicon devices within optical fibers." Optics letters 39.4 (2014): 861-864.
Badding, John V., et al. "Building semiconductor structures in optical fiber." Photonics Spectra 40.8 (2006): 80.
Yuan, Libo. "In-fiber integrated optic devices for sensing applications." OFS2012 22nd International Conference on Optical Fiber Sensor. International Society for Optics and Photonics, 2012.
He, Rongrui, et al. "Integration of gigahertz-bandwidth semiconductor devices inside microstructured optical fibres." Nature Photonics 6.3 (2012): 174-179.
Badding, John. "Integration of optical fiber and optoelectronic devices." Optical Fiber Communication Conference. Optical Society of America, 2013.

* cited by examiner

MICRO-STRUCTURED FIBER OPTIC CABLE FOR DOWNHOLE SENSING

CROSS-REFERENCE TO RELATED APPLICATION

The present application is a U.S. National Stage Application of International Application No. PCT/US2015/042902 filed Jul. 30, 2015, which is incorporated herein by reference in its entirety for all purposes.

TECHNICAL FIELD

The present disclosure relates generally to optical communications in a wellbore environment and, more particularly, to hybrid semiconductor-fiber devices used in a downhole optical communication networks.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

Upon drilling a wellbore that intersects a subterranean hydrocarbon-bearing formation, a variety of downhole tools may be positioned in the wellbore during exploration, completion, production, and/or remedial activities. For example, sensor components may be lowered into the wellbore during drilling, completion, and production phases of the wellbore. Such sensor components are often lowered downhole by a wireline, a slickline, a work string, or a drill string, and the sensors are used to perform a variety of downhole logging services. Sometimes the sensors are coupled to communication systems for conveying data indicative of sensed downhole parameters from the downhole sensor component to a surface location. For example, the downhole system (e.g., wireline, slickline) may utilize a fiber optic communication system for relaying sensed parameter measurement data from the downhole sensor to the surface for evaluation in real time or near real time.

In existing optical communication systems, an optical fiber is typically used to guide and propagate light waves from a source to a receiver (or detector). Light wave sources are often unable to operate at high temperatures experienced in a wellbore, so the sources are often positioned at a surface of the wellbore instead of downhole. Unfortunately, existing methods for communicating sensor signals from downhole to the surface using optical fibers (with a surface-positioned source and receiver) are generally limited to low sensitivity levels. For example, communication systems that use external optical or electrical modulation components positioned downhole along the optical fiber can lead to undesirable variation in the sensor data signal, due to losses at the interface between the fiber and the modulation components. In addition, these modulation components tend to add undesirable bulk to the optical fiber communication system. Some fiber communication systems are designed to sense downhole properties based on mechanical changes to the fiber itself, but these systems are limited to sensing a small range of properties at relatively low sensitivities.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1A:
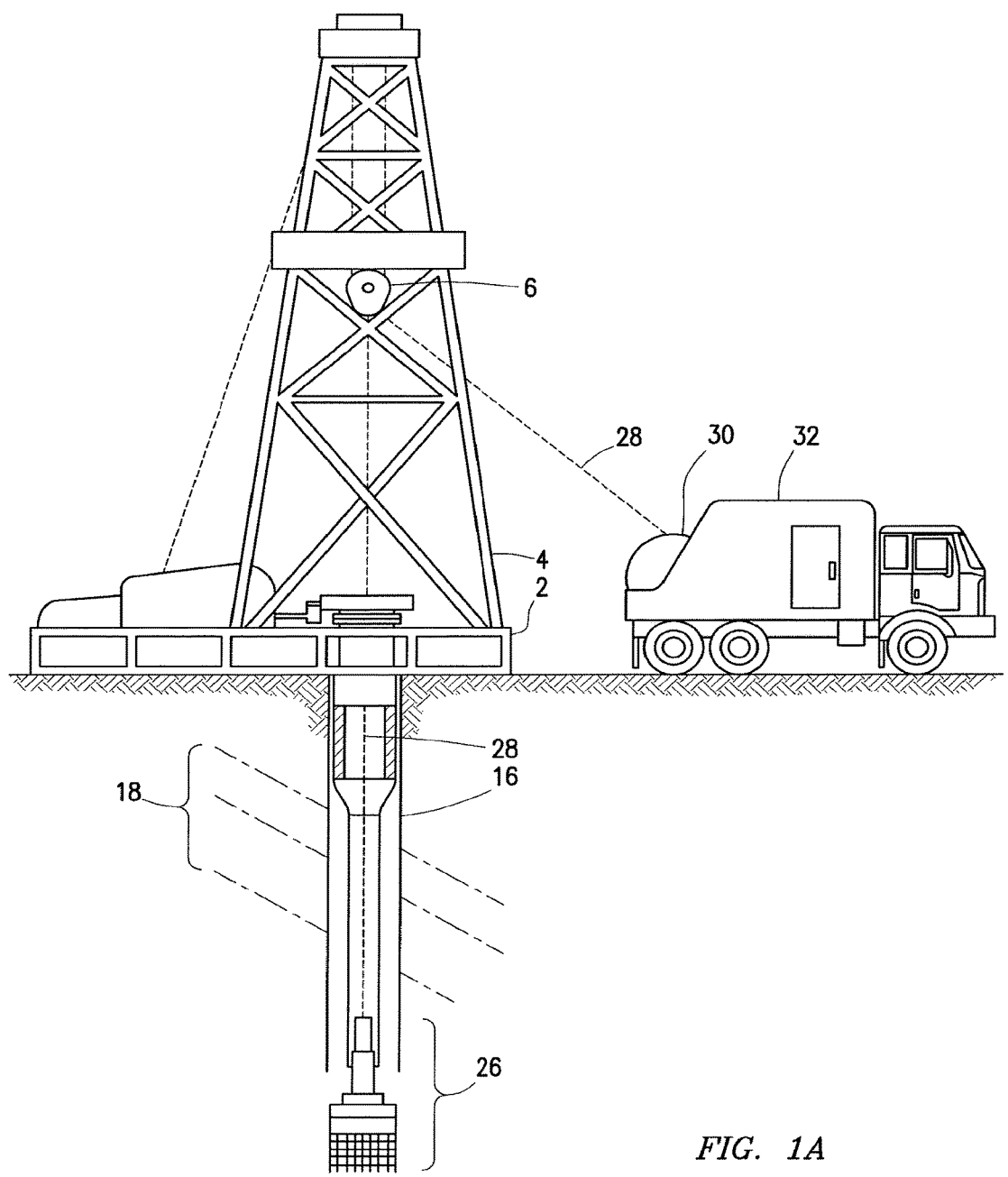
FIG. 1A is a schematic partial cross-sectional view of a conveying member being deployed in a wellbore environment, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

For purposes of this disclosure, a controller may include any instrumentality or aggregate of instrumentalities operable to compute, classify, process, transmit, receive, retrieve, originate, switch, store, display, manifest, detect, record, reproduce, handle, or utilize any form of information, intelligence, or data for control purposes. The controller may include random access memory (RAM), one or more processing resources such as a central processing unit (CPU) or hardware or software control logic, ROM, and/or other types of nonvolatile memory. Some embodiments of the controller may be part of an information handling system, which may include one or more disk drives, one or more network ports for communication with external devices as well as various input and output (I/O) devices, such as a keyboard, a mouse, and a video display. The controller may also include one or more buses operable to transmit communications between various hardware components, in addition to one or more interface units capable of transmitting one or more signals to another controller, actuator, or like device Certain embodiments according to the present disclosure may be directed to systems and methods for sensing and communicating downhole parameters using a hybrid micro-structured fiber optic cable. The micro-structured fiber optic cable generally includes a cable formed from a material with an array of holes and/or capillaries formed therein. The capillaries are arranged to form a "cladding" portion of the cable surrounding a solid "core" of the cable. The micro-structured fiber optic cable may be specifically adapted to communicate and/or amplify sensor signals indicative of the sensed downhole parameters. These sensed downhole parameters may relate to a downhole temperature, pressure, magnetic field, electromagnetic energy, radioactivity, telemetry signal, or some other downhole measurement.

Existing techniques for communicating downhole sensor measurements to the surface via a fiber optic cable have certain drawbacks associated therewith. For example, fiber optic cables are sometimes used to perform downhole sensor measurements using the physical structure of the fiber itself. Such fiber optic cables have been designed to exhibit changes in their physical properties in response to certain downhole parameters like temperature, pressure, or vibration. The glass that forms part of the fiber optic cables can deform as a result of exposure to certain downhole temperatures, pressures, or vibrations, and this deformation can change the way light is propagated through the fiber optic cable. Unfortunately, these existing fiber optic cables are limited to sensing downhole parameters that directly affect the physical properties of the cable. In addition, there is no way to increase the sensitivity of such measurements.

In other existing fiber optic downhole sensing systems, the light signals can be modulated through the use of an external modulator coupled to a downhole section of the fiber optic cable. Such modulators may include an optical modulator in which a signal-controlled element possessing an electro-optical effect is used to change the phase, frequency, amplitude, or polarization of the light beam traveling through the modulator. Other systems utilize an electrical modulator that is coupled to the fiber optic cable via a receiver and transmitter. Such systems typically transform the optical signal from the fiber optic cable to an electrical signal via the receiver, modulate the electrical signal via the electrical modulator, and transform the modulated electrical signal back to an optical signal for transmission through the fiber optic cable via the transmitter. These external signal modulators (both optical and electrical) can add undesirable bulk to the optical fiber communication system. In addition, external modulators can limit performance of the system due to losses and reflections of the optical signal experienced at the breaks in the fiber (i.e., junctions between the optical fiber and the modulator, receiver, and/or transmitter).

To address these drawbacks, the disclosed system for modulating optical signals through a fiber optic cable in response to a sensed downhole parameter may include a micro-structured fiber optic cable having opto-electronic circuitry built into the internal structure of the cable. That is, the opto-electronic circuitry may be formed into one or more of the capillaries of the micro-structured fiber optic cable, via doping or some other deposition process. The opto-electronic circuitry may include diodes, triodes, and other components that are communicatively coupled to external sensors for measuring downhole properties. The opto-electronic circuitry may also include an internal sensor in the form of a functional material disposed within the internal structure (e.g., capillaries) of the micro-structured fiber optic cable and used to measure downhole properties.

In some embodiments, the micro-structured fiber optic cable may be built into a downhole conveying member, such as a wireline or slickline, or some other downhole tool, such as a permanent completion, e.g. as part of the production string or behind casing. The micro-structured fiber optic cable may be coupled at one end to a surface-mounted light source that outputs light into the fiber optic cable, and at an opposite end to a surface-mounted receiver for receiving the modulated light signal from the fiber optic cable. The micro-structured fiber optic cable may extend continuously between the source and the receiver, such that no breaks or transition points are disposed along the length of the fiber optic cable.

In the disclosed techniques, the micro-structured fiber optic cable may enable more sensitive downhole sensor measurements to be taken and/or communicated to the surface of a wellbore. The micro-structured fiber optic cable is not limited to passive signal transmission operations, but may also be used to amplify downhole sensor signals. Because the circuitry used to modulate the light signal moving through the fiber is located entirely within the micro-structured fiber optic cable, the sensing/communication system can be constructed in a smaller and more rugged packaging than existing systems that utilize external modulators.

Turning now to the drawings, FIG. 1A illustrates oil well equipment being used in an illustrative drilling environment. A drilling platform 2 supports a derrick 4 having a traveling block 6 for raising and lowering a drill string (not shown). The drill string creates a wellbore 16 that passes through various formations 18. At various times during the drilling process, the drill string may be removed from the wellbore 16.

Once the drill string has been removed, a subsurface device 26 (e.g., a plug, packer, etc.) may be lowered downhole to the desired setting depth via a conveying member 28. The subsurface device 26 may be used, for example, to seal off or isolate zones inside the wellbore 16. When the subsurface device 26 reaches the desired location within the wellbore 16, the subsurface device 26 is set in place within the wellbore 16. After the subsurface device 26 is securely set in place, the conveying member 28 may be retracted. In other embodiments, the subsurface device 26 may include one or more logging tools that may utilize the disclosed techniques to transmit sensor signals from the tool to the surface. Such logging tools may include for example, sensors for logging downhole parameters such as temperature, pressure, magnetic field, electromagnetic energy, radioactivity, resistivity, shock, vibrations, torque, and telemetry signals, among others. The logging tools may be lowered on a conveying member 28, as illustrated, or may be lowered along a tool string selectively positioned downhole during well completions or a drill string used to form the wellbore 16.

In some embodiments, the conveying member 28 may include a slickline or a wireline. Such slicklines/wirelines typically include one or more cables running the length of the conveying member 28 and secured within a polymer material surrounded by a protective coating sheath. The conveying member 28 may be unspooled from a spool 30 on a slickline truck 32 onto a sheave (e.g., traveling block 6 or some other sheave) on the drilling platform 2. From here, the conveying member 28 with the subsurface device 26 may be lowered (deployed) into the wellbore 16 and subsequently raised (retracted) from the wellbore 16 after placing the tool-string or subsurface device 26 as described above. A tool-string 26 may be sonic tool, or formation analyzer, or a combination of gamma-ray, resistivity, and neutron sensing devices.

In presently disclosed embodiments, the conveying member 28 may include a hybrid micro-structured fiber optic cable routed therethrough and used to communicate sensor information and/or telemetry signals from a position downhole to a position at the surface of the wellbore 16. The micro-structured fiber optic cable may include internal optoelectronic circuitry for modulating an optical signal through the cable based on a sensed downhole parameter.

Figure 1B:
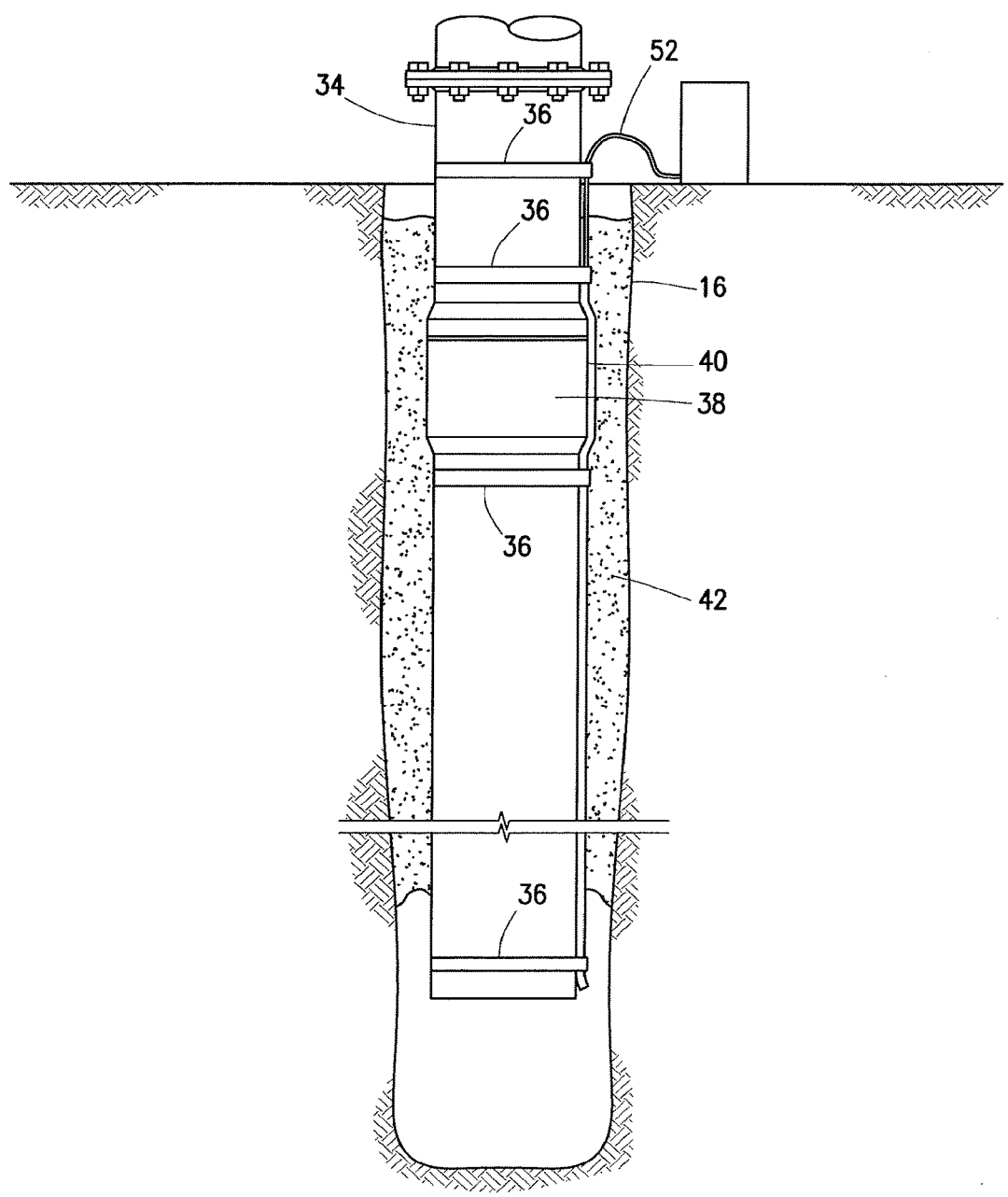
FIG. 1B is a schematic partial cross-sectional view of a permanent completion with a fiber optic cable disposed in a wellbore environment, in accordance with an embodiment of the present disclosure.

FIG. 1B shows another illustrative downhole environment in which the disclosed micro-structured fiber optic cable may be deployed. This embodiment shows a micro-structured fiber optic cable 52 being used in a permanent completion installed within the wellbore 16. Specifically, the micro-structured fiber optic cable 52 may be installed behind a casing string 34 used to line the wellbore 16 during completions. The casing 34 is a tubular pipe, usually made of steel, that preserves the integrity of the wellbore 16. As shown, the fiber optic cable 52 may be secured to the casing string 34 by bands 36. Where the cable 52 passes over a casing joint 38, it may be protected from damage by a cable protector 40. The remaining annular space may be filled with cement 42 to secure the casing 34 and the fiber optic cable 52 in place and to prevent fluid flows in the annular space. In a similar manner, the micro-structured fiber optic cable 52 may be installed within or along other permanent completions, such as a production string positioned within the wellbore 16 for routing various formation fluids to the surface.

It should be noted that this well configuration is merely illustrative and not limiting on the scope of the disclosure. Multiple fiber optic cables 52 may be used in permanent completions within production wells with multiple production zones that can be individually controlled. Similarly, multiple fiber optic cables 52 may be installed in permanent completions within injection wells having multiple injection zones.

As shown herein, the disclosed micro-structured fiber optic cable 52 may be deployed and/or secured within the wellbore 16 via a conveying member (e.g., 28 of FIG. 1A) or as part of a permanent completion (e.g., within a production string, or behind the casing 34 as shown in FIG. 1B). Once deployed in the wellbore 16, the micro-structured fiber optic cable 52 may be used to communicate sensor information and/or telemetry signals from a position downhole to a position at the surface of the wellbore 16. Having now described various ways the fiber optic cable 52 may be introduced into the wellbore 16, a more detailed description of the micro-structured fiber optic cable 52 will be provided.

Figure 2:
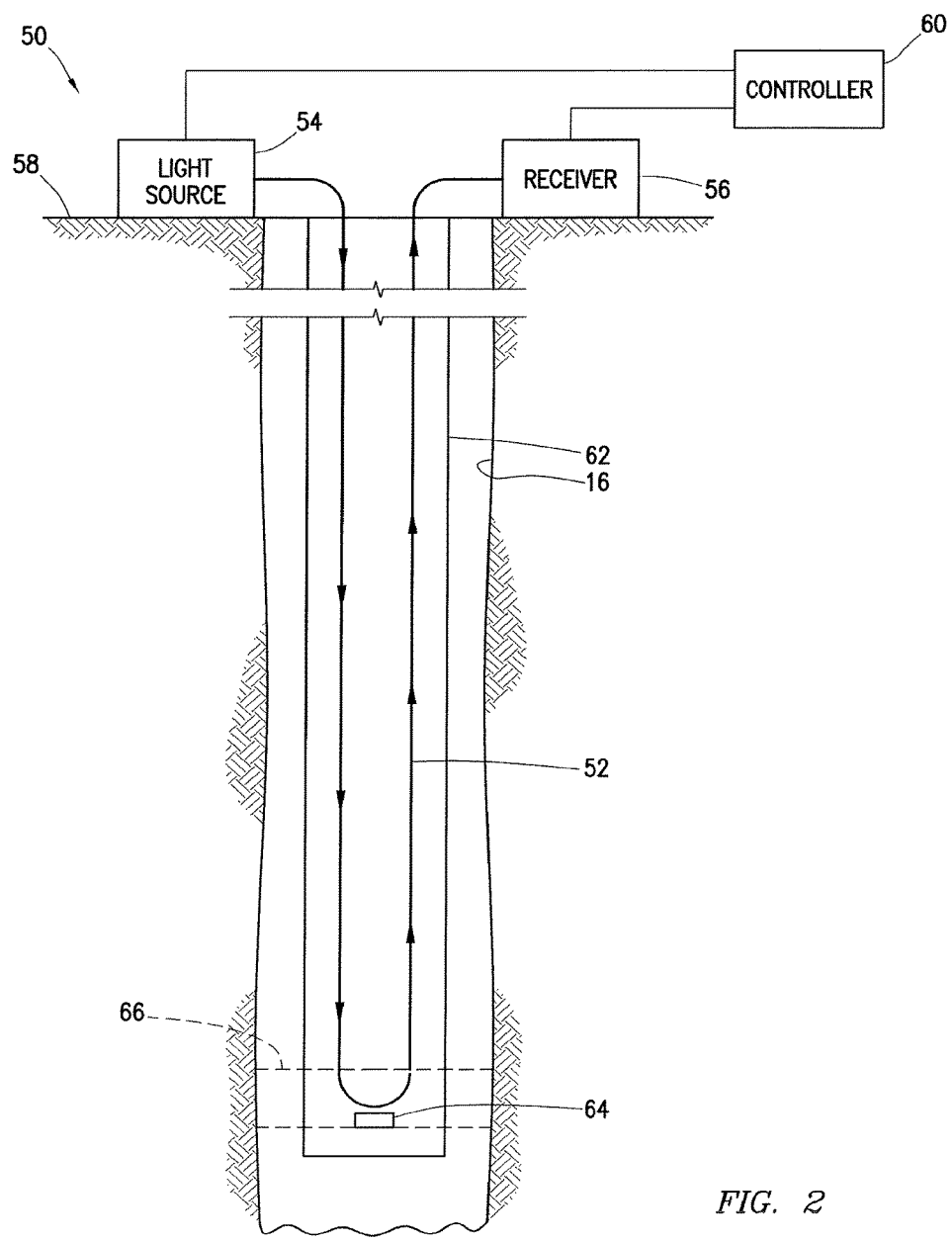
FIG. 2 is a schematic representation of a hybrid micro-structured fiber being deployed in a wellbore environment for sensing and/or telemetry, in accordance with an embodiment of the present disclosure.

FIG. 2 is a detailed schematic illustration of a downhole sensing system 50 using such a micro-structured fiber optic cable 52 for sensor communication. In the illustrated embodiment, the micro-structured fiber optic cable 52 is extended between an optical source 54 at a first end and an optical receiver 56 at a second end opposite the first end. The optical source 54 may output electromagnetic energy (e.g., a light beam) into the micro-structured fiber optic cable 52, while the optical receiver 56 detects a modulated electromagnetic signal (e.g., modulated light signal) output from the micro-structured fiber optic cable 52. As illustrated, the source 54 and the receiver 56 may each be disposed at a surface 58 of the wellbore 16. It may be desirable for the source 54 to be disposed at the surface, since the source 54 may include laser components that are unable to operate at wellbore conditions (e.g., higher temperatures). Similarly, the receiver 56 may include certain components that are not operable at wellbore conditions. In some embodiments, the source 54 and the receiver 56 may be co-located at the surface 58, or built into a single package.

In some embodiments, the downhole sensing system 50 may also include a controller 60 disposed at the surface 58 and communicatively coupled to the source 54 and/or the receiver 56. The controller 60 may include one or more processing components to execute programs for determining or estimating the value of a sensed downhole parameter based on the modulated optical signal received at the optical receiver 56. The controller 60 may be part of a rig-mounted control panel, or it may be packaged with the receiver 56. The controller 60 may be communicatively coupled to the source 54 and/or receiver 56 via a wired or wireless connection.

In the illustrated embodiment, the micro-structured fiber optic cable 52 extends continuously or nearly continuously between the source 54 and the receiver 56. That is, no additional electronic components (e.g., external modulators) are disposed along the length of the micro-structured fiber optic cable 52 that is positioned downhole. This may help to reduce the overall size for packaging the downhole sensing system 50. In addition, this arrangement may increase the reliability of the downhole sensing system 50 since the micro-structured fiber optic cable 52 does not feature external electronics that might otherwise degrade or operate inefficiently at high wellbore temperatures. The continuous extension of the micro-structured fiber optic cable 52 may also enable more reliable field operation of the sensing system 50, since no sensitive optical fiber connections or components are exposed in the field. This may lead to lower tool costs, since additional components for protecting the optical components/connections are not needed. Further, since there are no breaks along the fiber 52 (except at the source 54 and the receiver 56), the light signal traveling through the fiber 52 does not experience additional propagation losses, such as those experienced in systems with external modulators.

The micro-structured fiber optic cable 52 may extend downward into the wellbore 16 from the source 54, curve at a lower portion, and extend upward toward the receiver 56 at the surface 58 of the wellbore 16. The micro-structured fiber optic cable 52 may be constructed with internal modulation circuitry capable of sensing downhole parameters at any point along the entire length of the micro-structured fiber optic cable 52.

In the illustrated embodiment, the micro-structured fiber optic cable 52 is generally positioned within a downhole component 62 that can be selectively lowered or raised through the wellbore 16. For example, the downhole component 62 may include a slickline, a wireline, a work string, permanent completion (e.g., casing or production string), or a drill string. Such components are typically used to position various subsurface equipment downhole, or to perform drilling or completion operations. In addition, the downhole component 62 may be used to lower the micro-structured fiber optic cable 52 to a desired downhole position for taking sensor measurements. The downhole component 62 could also be part of a permanent completion, e.g. disposed in the production string or behind casing.

In some embodiments, the downhole component 62 may also include an external sensor 64 for use with the micro-structured fiber optic cable 52. The external sensor 64 may be disposed in a desired position of the downhole component 62 for taking downhole measurements, this position being near a section of the micro-structured fiber optic cable 52. The sensor 64 may be used to detect a downhole parameter within a certain downhole region 66. The downhole component 62 may be lowered into the wellbore 16 to position the sensor 64 near the desired downhole region 66 to perform the measurement. The sensor 64 may include a temperature sensor, a pressure sensor, a magnetic field sensor, an electromagnetic energy sensor, or a radioactivity sensor. The sensor 64 may be communicatively coupled to the opto-electronic circuitry of the micro-structured fiber optic cable 52 to modulate the optical signal through the cable based on the sensed parameter detected via the external sensor 64. In other embodiments, the micro-structured fiber optic cable 52 may include its own built in functional material that is used to sense certain downhole parameters for modulating the optical signal, without the use of an external sensor.

Figure 3:
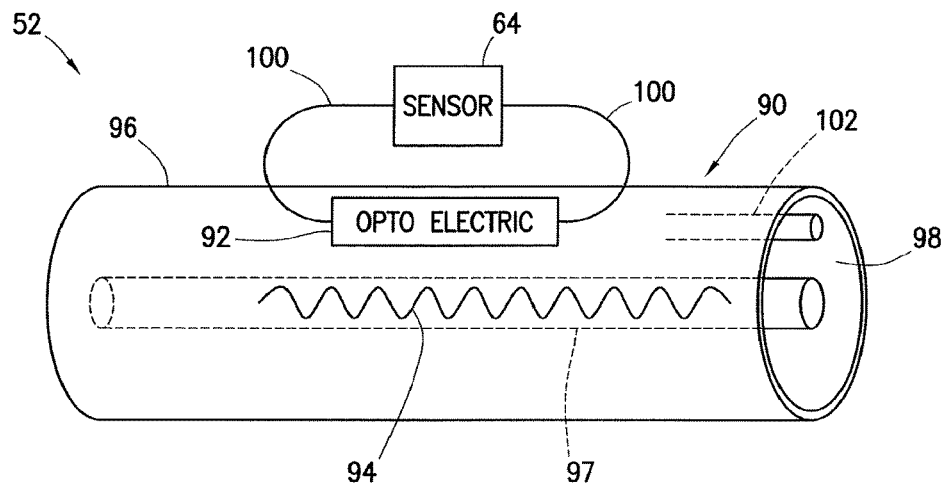
FIG. 3 is a schematic representation of a section of the hybrid micro-structured fiber of FIG. 2, in accordance with an embodiment of the present disclosure.

FIG. 3 illustrates a section of an embodiment of the micro-structured fiber optic cable 52. The micro-structured fiber optic cable 52 may utilize an active micro-structured optical fiber 90, with an integrated, in-fiber opto-electronic device or circuitry 92, to modulate and guide an optical beam 94 through a core 97 of the fiber 90. The opto-electronic circuitry 92 may include a semiconductor diode, triode, or a combination thereof disposed internally within the fiber 90. The opto-electronic circuitry 92 may be used to modulate one or more factors or parts of the light beam moving through the fiber 90 based on the sensed downhole parameter. For example, the opto-electronic circuitry 92 may modulate the optical signal to encode sensor information by changing the intensity (amplitude), the phase, the polarization, and/or the frequency of the optical signal by a certain amount.

As illustrated, the micro-structured fiber optic cable 52 may include a protective sheath (or jacket) 96 surrounding the micro-structured optical fiber 90. In addition to the opto-electronic circuitry 92, the micro-structured fiber 90 may include a layer of glass 98 disposed between the jacket 96 and the fiber optic core 97. The opto-electronic circuitry 92 may be disposed in holes or capillaries formed through the layer of glass 98.

In embodiments where the downhole component (e.g., 62 of FIG. 2) contains an external downhole sensor 64, the micro-structured optical fiber 90 may include connections 100 to route electrical signals from the sensor 64 (an electrical device) to the internal opto-electronic circuitry 92. The sensor 64 may detect a downhole parameter and output an electrical signal indicative of the sensed downhole parameter to the opto-electronic circuitry 92 through the connections 100. The opto-electronic circuitry 92 may then modulate the light beam 94 propagating inside the fiber 90, in response to the electrical signal applied from the sensor 64. More specifically, the signal from the sensor 64 may change one or more electromagnetic properties of the opto-electronic circuitry 92. Such properties may include, for example, permittivity, permeability, geometry, or some other aspect of the section of fiber 90 through which the light beam 94 travels near the opto-electronic circuitry 92. The changed properties of the fiber 90 may affect one or more factors (e.g., amplitude, phase, polarization, frequency) of the light signal 94 moving through the core 97. More specifically, the changed properties of the opto-electronic circuitry 92 may affect the refractive index of the cladding portion of the micro-structured optical fiber 90 or the photonic band-gap effect through the fiber 90, thus changing the way light propagates through the fiber 90.

In some embodiments, the opto-electronic circuitry 92 may include or work in conjunction with a functional material 102 disposed within the internal structure (e.g., capillaries) in the glass portion 98 of the fiber 90. The functional material 102 may operate as an onboard sensor for picking up a signal or downhole property in the vicinity of the micro-structured fiber optic cable 52. For example, the functional material 102 may be a material designed to react when exposed to a certain downhole parameter (e.g., temperature, telemetry signal, radioactivity, electromagnetic energy, magnetic field, etc.). When the functional material 102 senses the downhole parameter, the functional material 102 may react by affecting a property of the opto-electronic circuitry 92 (e.g., geometry, permeability, permittivity) in a way that modulates the optical signal 94 through traveling through the fiber 90. Examples of certain functional materials 102 that are sensitive to specific downhole properties may include semiconductor materials such as gallium arsenide (GaAs), magnetostrictive materials such as nickel, piezoelectric materials such as quartz, and nonlinear crystals such as lithium niobate ($LiNbO_3$), among others.

In still other embodiments, the opto-electronic circuitry 92, as well as the fiber 90 itself, may be designed to respond to certain downhole parameters in a manner that modulates the optical signal directed through the fiber 90. For example, the temperature or pressure of the downhole region where the fiber optic cable 52 is positioned may affect the frequency of the optical signal moving through the fiber 90 based on a change in fiber dimension caused by the downhole temperature/pressure.

The opto-electronic circuitry 92 and/or the functional material 102 may be used to modulate the light traveling through the fiber core 97, without deforming or otherwise affecting the glass 98 in the micro-structured fiber optic cable 52. The micro-structured fiber optic cable 52 may be highly sensitive due to the close proximity of the in-fiber opto-electronic circuitry 92 and/or functional material 102 to the external sensor 64 and/or the sensed parameter. As a result of this close proximity, a moderate variation in the opto-electronic circuitry 92 (induced by an external signal) may have a large effect on modulation of the light beam 94. In this way, the opto-electronic circuitry 92 may have two functionalities: it may pick up a weak signal indicative of a sensed downhole parameter, or it may further amplify the signal for easier detection in the modulated optical signal at the surface.

The in-fiber opto-electronic circuitry 92 is robust and may be used in high temperature and pressure environments to modulate the optical signal in a manner that is particularly suitable for downhole telemetry and logging operations. Therefore, the micro-structured fiber optic cable 52 may provide an efficient optical communication device for use in harsh wellbore environments.

Figure 4:
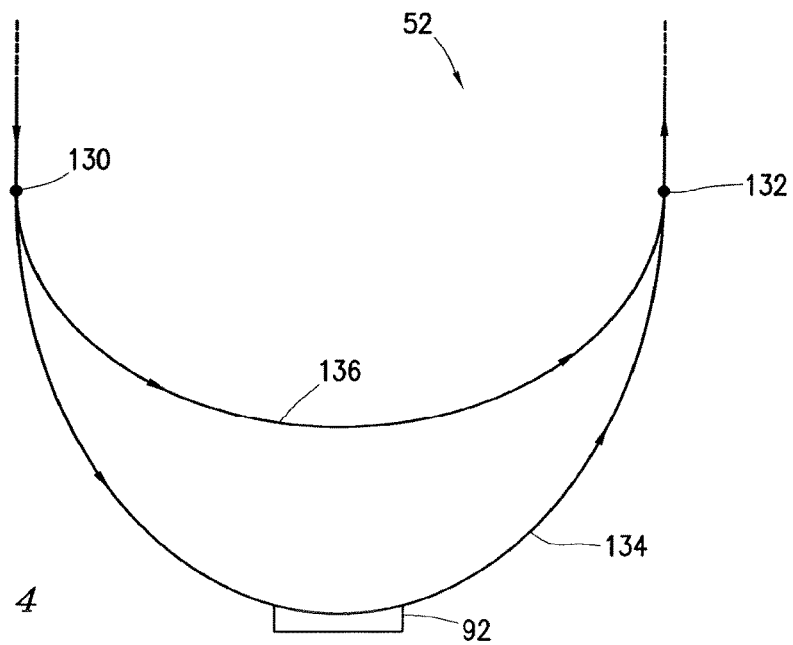
FIG. 4 is a schematic representation of a split hybrid micro-structured fiber used to perform sensing and/or telemetry in a drilling environment, in accordance with an embodiment of the present disclosure.

In some embodiments, the micro-structured fiber optic cable 52 may include a split portion such that a first branch of the micro-structured optical fiber is separated from a second branch of the micro-structured optical fiber along the split portion. This is illustrated in FIG. 4, where the micro-structured fiber optic cable 52 includes a beam splitter 130 and a beam combiner 132 used to attach a first branch 134 to a second branch 136 (i.e., portion of the micro-structured optical fiber). The branches 134 and 136 may be welded together at the junctions where the beam splitter 130 and the beam combiner 132 are shown. The beam splitter 130 and the beam combiner 132 may be used to split the optical beam of the micro-structured fiber optic cable 52 into two separate beams, one moving through each of the two branches 134 and 136.

In the illustrated embodiment, the first branch 134 may include the opto-electronic circuitry 92 used to modulate the optical signal moving through the first branch 134 based on a sensed downhole parameter. The opto-electronic circuitry 92 may work in conjunction with one or more of the above-described functional materials 102 or external sensors 64 of FIG. 3 to perform the signal modulation along the first branch 134.

In some embodiments, the second branch 136 may include an optical fiber portion that does not feature opto-electronic circuitry for modulating the optical signal through the second branch 136. Instead, the initial optical signal received from the source and/or the beam splitter 130 may be transmitted directly through the second branch 136 without modulation. In such instances, the optical signals from the first and second branch 136 may be combined at the beam combiner 132 to generate the modulated optical signal that is directed to the surface-mounted receiver. The modulated optical signal may than be received and evaluated to detect an interference pattern in the signal indicative of the sensed downhole parameter. For example, the sensed downhole parameter may be encoded in the phase difference between the optical signal modulated at the first branch 134 and the optical signal transmitted through the second branch 136.

Figure 5:
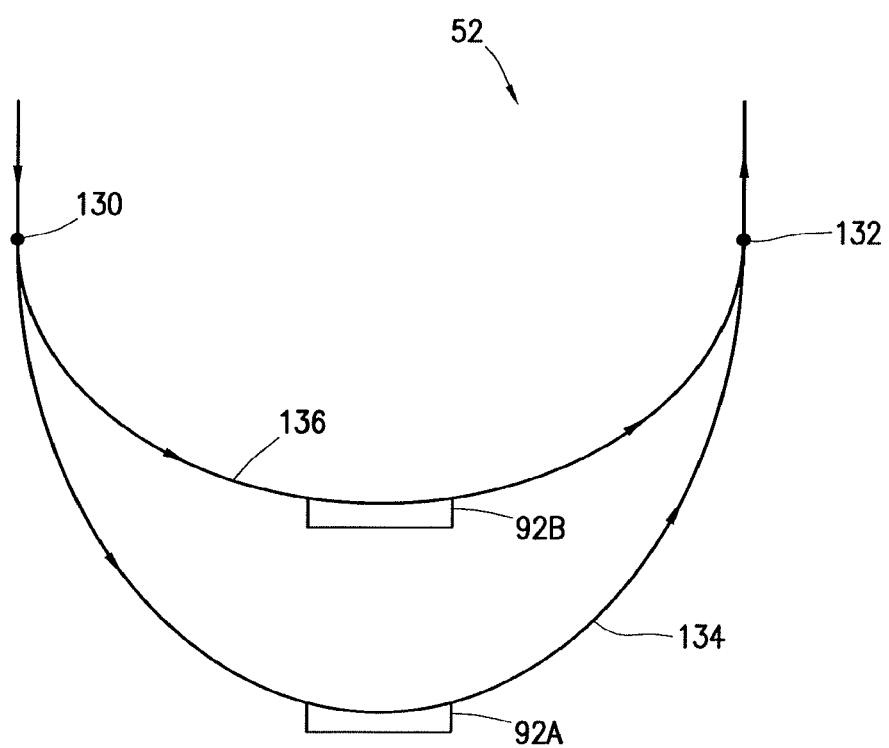
FIG. 5 is a schematic representation of a split hybrid micro-structured fiber used to perform sensing and/or telemetry in a drilling environment, in accordance with an embodiment of the present disclosure.

In other embodiments, the second branch 136 may also include opto-electronic circuitry 92B for modulating the signal moving through the second branch 136 in response to a sensed downhole parameter, as shown in FIG. 5. In such embodiments, the opto-electronic circuitry 92A in the first branch 134 may modulate the optical signal through the first branch 134 based on a first downhole parameter, and the opto-electronic circuitry 92B in the second branch 136 may modulate the optical signal through the second branch 136 based on a different downhole parameter. To that end, the opto-electronic circuitry 92A in the first branch 134 may utilize a sensor component (e.g., external sensor 64 or internal functional material 102 of FIG. 3) designed to detect a first downhole parameter (e.g., pressure), while the opto-electronic circuitry 92B in the second branch 136 may utilize a sensor component designed to detect a different downhole parameter (e.g., magnetic field). The opto-electronic circuitry 92 in each branch may be designed to modulate a different factor of the optical beam traveling through the respective branches 134 and 136. For example, the opto-electronic circuitry 92 in the first branch 134 may be designed to modulate a frequency of the optical signal traveling through the first branch 134, while the opto-electronic circuitry 92 in the second branch 136 may be designed to modulate the amplitude of the optical signal traveling through the second branch 136.

In other embodiments, the split micro-structured fiber optic cable 52 may utilize the opto-electronic circuitry 92 in the different branches 134 and 136 to modulate different polarizations of the optical signal based on the sensed downhole parameters. To that end, the beam splitter 130 may split the optical beam in a way that filters and directs one polarization of light into the first branch 134 and another polarization of light into the second branch 136. The opto-electronic circuitry 92 in each branch may then modulate the same factor of the optical signals flowing therethrough based on the sensed downhole parameters. Once the two modulated light beams and combined into the modulated optical signal received at the surface, the different downhole sensor signals may be encoded into different polarizations of the modulated optical signal. The modulated optical signal may be filtered and separated into two polarizations again at the surface for evaluation of the sensor signals.

Although two branches 134 and 136 are illustrated in FIGS. 4 and 5, it should be noted that other embodiments of the micro-structured fiber optic cable 52 may include more than two branches split off from the same beam splitter 130 or from multiple beam splitters disposed in series along the length of the micro-structured fiber optic cable 52. In this manner, the same micro-structured fiber optic cable 52 may be able to modulate any number of different factors of the optical signal transmitted downhole based on a desired number of sensed downhole parameters. In this way, the micro-structured fiber optic cable 52 may provide a physically compact system for encoding various sensor signals along a cable extending downhole.

Figure 6:
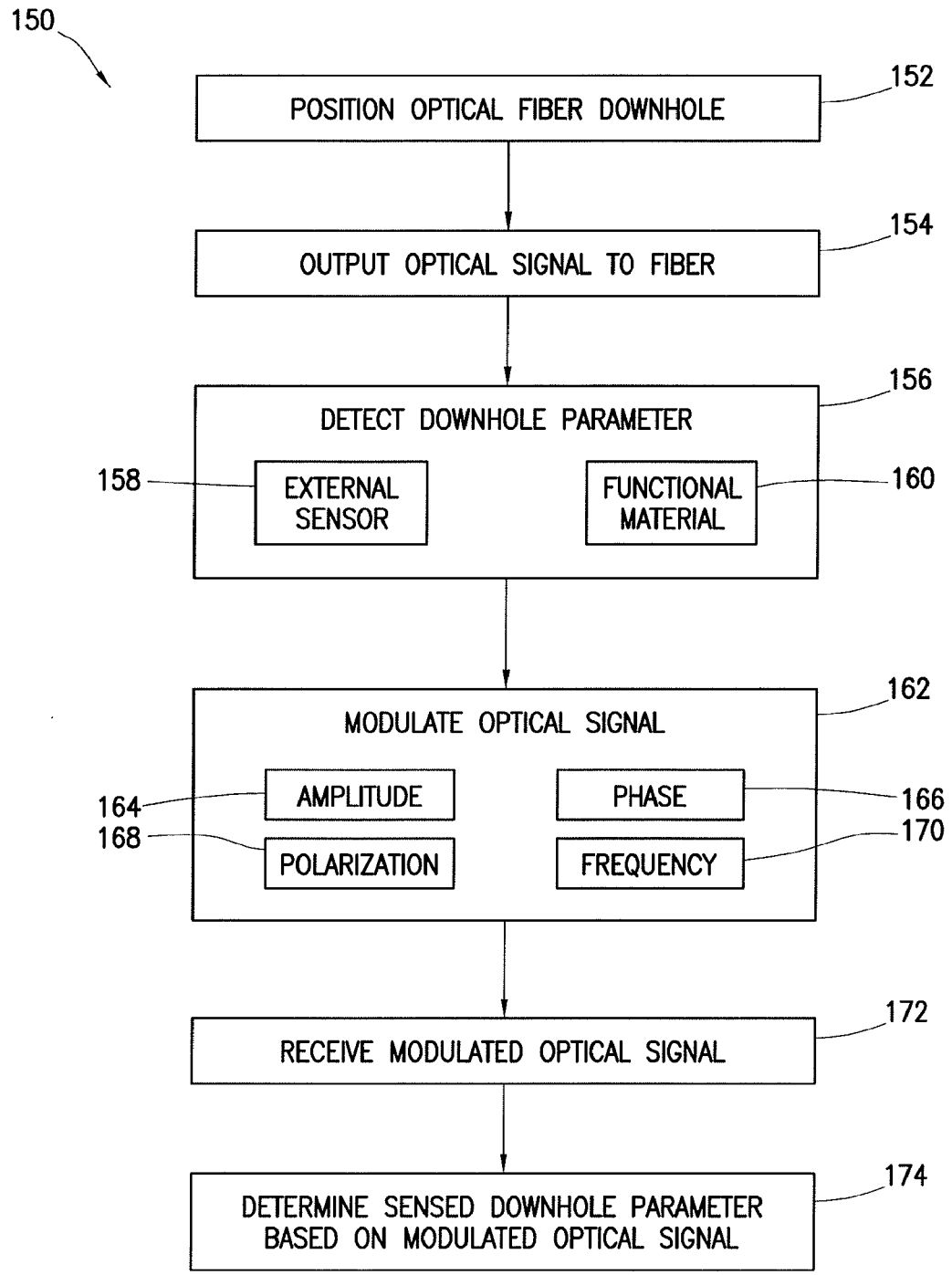
FIG. 6 is a process flow diagram of a method for operating the hybrid micro-structured fiber to perform downhole sensing and/or telemetry, in accordance with an embodiment of the present disclosure.

FIG. 6 is a process flow diagram illustrating a method 150 for using the micro-structured fiber optic cable to communicate sensed downhole parameters to the surface. The method 150 may include positioning (block 152) the micro-structured optical fiber downhole. This may involve lowering a downhole component such as a wireline, slickline, drill string, workstring, or permanent completion (e.g., casing or production string) having the micro-structured optical fiber built in. The method 150 may also include outputting (block 154) an optical signal to the micro-structured optical fiber from the source at the surface. In addition, the method 150 may include detecting a downhole parameter (block 156). This may be accomplished using an external sensor 158 (e.g., sensor 64 of FIG. 3) or using a functional material 160 that is incorporated with the micro-structured optical fiber.

Upon detecting the downhole parameter, the opto-electronic circuitry that is internal to the micro-structured fiber optic cable may modulate (block 162) the optical signal based on the sensed downhole parameter. For example, the opto-electronic circuitry may use one or more semiconductor devices to alter the electromagnetic properties (e.g., permeability, permittivity, or geometry) of the fiber in response to the detected sensor signal. The opto-electronic circuitry may thus modulate the amplitude 164, the phase 166, the polarization 168, or the frequency 170 of the optical beam moving through the micro-structured fiber optic cable 52.

The method 150 may further include receiving (block 172) the modulated optical signal from the micro-structured fiber optic cable 52 at a receiver. Again, the receiver used to receive the modulated optical signal may be positioned at the surface of the wellbore. The method 150 may also include determining (block 174) or estimating a value of the sensed downhole parameter based on the modulated optical signal received at the surface. This may involve comparing the initial optical signal output from the source to the modulated signal received at the receiver. In addition, this may involve evaluating different factors (e.g., amplitude, phase, polarization, or frequency) of the modulated signal that were used to encode different sensor signals.

Embodiments disclosed herein include:

A. A system including a micro-structured fiber optic cable for use in a wellbore environment. The micro-structured fiber optic cable includes a micro-structured optical fiber including an internal structure and opto-electronic circuitry disposed within the internal structure to modulate an optical signal directed through the micro-structured optical fiber based on a sensed downhole parameter. The system also includes an optical source coupled to a first end of the hybrid fiber-optic cable to output the optical signal into the microstructured optical fiber, and an optical receiver coupled to a second end of the hybrid fiber-optic cable to receive a modulated optical signal from the micro-structured optical fiber.

B. A system including a slickline or wireline for use in wellbore environment and a micro-structured optical fiber disposed within the slickline or wireline for positioning the micro-structured optical fiber at least partially downhole. The micro-structured optical fiber includes an internal structure and opto-electronic circuitry disposed within the internal structure to modulate electromagnetic energy directed through the micro-structured optical fiber based on a sensed downhole parameter.

C. A method including positioning a micro-structured optical fiber downhole, wherein the micro-structure optical fiber includes an internal structure and opto-electronic circuitry disposed within the internal structure. The method also includes outputting an optical signal from an optical source to the micro-structured optical fiber, modulating the optical signal via the opto-electronic circuitry based on a sensed downhole parameter to provide a modulated optical signal through the micro-structured optical fiber, and receiving the modulated optical signal at an optical receiver coupled to the micro-structured optical fiber. The method further includes estimating a value of the sensed downhole parameter based on the modulated optical signal received at the optical receiver.

Each of the embodiments A, B, and C may have one or more of the following additional elements in combination: Element 1: wherein the optical source and the optical receiver are each disposed at a surface location proximate the wellbore environment. Element 2: wherein the micro-structured optical fiber includes a layer of glass disposed between a protective sheath and a fiber optic core. Element 3: wherein the opto-electronic circuitry includes a diode, a triode, or some combination thereof disposed within the internal structure of the micro-structured optical fiber. Element 4: wherein the opto-electronic circuitry includes a functional material disposed within the internal structure of the micro-structured optical fiber. Element 5: wherein the micro-structured optical fiber includes connections to route electrical signals from an electrical device disposed external to the micro-structured optical fiber to the internal opto-electronic circuitry. Element 6: wherein the sensed downhole parameter includes a pressure, a temperature, a magnetic field, electromagnetic energy, radioactivity, a telemetry signal, a sensor measurement, or any combination thereof. Element 7: wherein the micro-structured fiber optic cable extends continuously between the optical source and the optical receiver. Element 8: wherein the micro-structured fiber optic cable is disposed within a slickline, a wireline, a work string, a production string, a permanent completion, or a drill string. Element 9: wherein the micro-structured fiber optic cable includes a split portion such that a first branch of the micro-structured optical fiber is separated from a second branch of the micro-structured optical fiber.

Element 10: further including a sensor disposed along the slickline or wireline, wherein the sensor is communicatively coupled to the opto-electronic circuitry of the micro-structured optical fiber to provide electrical signals indicative of the sensed downhole parameter from the sensor to the micro-structured optical fiber. Element 11: wherein the micro-structured optical fiber further includes a functional material disposed within the internal structure of the micro-structured optical fiber to detect the sensed downhole parameter.

Element 12: wherein estimating the value of the sensed parameter includes comparing the modulated optical signal to the optical signal output from the optical source to determine a change in amplitude, phase, polarization, frequency, or some combination thereof. Element 13: further including: directing the optical signal through a split in the micro-structured optical fiber to send the optical signal to a first branch and a second branch of the micro-structured optical fiber; modulating the optical signal via the opto-electronic circuitry disposed in the first branch of the micro-structured optical fiber to generate a modulated optical signal in the first branch; transmitting the optical signal through the second branch of the micro-structured optical fiber; combining the modulated optical signal from the first branch with the optical signal from the second branch to form a combined signal via a junction along the micro-structured optical fiber; and receiving the combined signal via the optical receiver. Element 14: further including directing an electrical signal from a downhole sensor into the opto-electronic circuitry to modulate the optical signal. Element 15: further including generating a signal indicative of the sensed downhole parameter through a functional material disposed within the micro-structured optical fiber to modulate the optical signal. Element 16: further including: modulating a first factor of the optical signal based on a first sensed downhole parameter and modulating a second factor of the optical signal based on a second sensed downhole parameter to generate the modulated optical signal; and estimating a value of the first sensed downhole parameter and the second sensed downhole parameter based on the modulated optical signal. Element 17: further including modulating the optical signal to amplify a sensor signal indicative of the sensed downhole parameter.

Although the present disclosure and its advantages have been described in detail, it should be understood that various changes, substitutions and alterations can be made herein without departing from the spirit and scope of the disclosure as defined by the following claims.

What is claimed is:

1. A system for use in a wellbore environment, comprising:
   a micro-structured fiber optic cable, comprising:
      a fiber optic core for guiding an optical signal therethrough;
      a protective sheath forming an outer layer of the micro-structured fiber optic cable;
      a layer of glass disposed between the protective sheath and the fiber optic core; and
      opto-electronic circuitry disposed in holes or capillaries formed through the layer of glass to modulate the optical signal directed through the micro-structured fiber optic cable based on a sensed downhole parameter;
   an optical source coupled to a first end of the hybrid fiber-optic cable to output the optical signal into the micro-structured fiber optic cable; and
   an optical receiver coupled to a second end of the hybrid fiber-optic cable to receive a modulated optical signal from the micro-structured fiber optic cable.

2. The system of claim 1, wherein the opto-electronic circuitry comprises a diode, a triode, or some combination thereof disposed within the internal structure of the micro-structured fiber optic cable.

3. The system of claim 1, wherein the opto-electronic circuitry comprises a functional material disposed within the internal structure of the micro-structured fiber optic cable.

4. The system of claim 1, wherein the micro-structured fiber optic cable comprises connections to route electrical signals from a downhole electrical device disposed external to the micro-structured fiber optic cable to the internal opto-electronic circuitry.

5. The system of claim 1, wherein the sensed downhole parameter comprises a pressure, a temperature, a magnetic field, electromagnetic energy, radioactivity, a telemetry signal, a sensor measurement, or any combination thereof.

6. The system of claim 1, wherein the micro-structured fiber optic cable extends continuously between the optical source and the optical receiver such that no breaks or transition points are disposed along the length of the micro-structured fiber optic cable.

7. The system of claim 1, wherein the micro-structured fiber optic cable is disposed within a slickline, a wireline, a work string, a production string, a permanent completion, or a drill string.

8. The system of claim 1, wherein the micro-structured fiber optic cable comprises a split portion such that a first branch of the micro-structured fiber optic cable is separated from a second branch of the micro-structured fiber optic cable.

9. A system comprising:
a slickline or wireline for use in wellbore environment; and
a micro-structured fiber optic cable disposed within the slickline or wireline for positioning the micro-structured fiber optic cable at least partially downhole, wherein the micro-structured fiber optic cable comprises:
a fiber optic core for guiding an optical signal therethrough;
a protective sheath forming an outer layer of the micro-structured fiber optic cable;
a layer of glass disposed between the protective sheath and the fiber optic core; and
opto-electronic circuitry disposed in holes or capillaries formed through the layer of glass to modulate optical signal directed through the micro-structured fiber optic cable based on a sensed downhole parameter.

10. The system of claim 9, further comprising a sensor disposed along the slickline or wireline, wherein the sensor is communicatively coupled to the opto-electronic circuitry of the micro-structured fiber optic cable to provide electrical signals indicative of the sensed downhole parameter from the sensor to the micro-structured fiber optic cable.

11. The system of claim 10, wherein the micro-structured fiber optic cable further comprises a functional material disposed within the internal structure of the micro-structured fiber optic cable to detect the sensed downhole parameter.

12. A method, comprising:
positioning a micro-structured fiber optic cable downhole, wherein the micro-structured fiber optic cable comprises:
a fiber optic core;
a protective sheath forming an outer layer of the micro-structured fiber optic cable;
a layer of glass disposed between the protective sheath and the fiber optic core; and
opto-electronic circuitry disposed in holes or capillaries formed through the layer of glass;
outputting an optical signal from an optical source to the fiber optic core of the micro-structured fiber optic cable;
modulating the optical signal via the opto-electronic circuitry based on a sensed downhole parameter to provide a modulated optical signal through the fiber optic core of the micro-structured fiber optic cable;
receiving the modulated optical signal at an optical receiver coupled to the micro-structured fiber optic cable; and
estimating a value of the sensed downhole parameter based on the modulated optical signal received at the optical receiver.

13. The method of claim 12, wherein estimating the value of the sensed parameter comprises comparing the modulated optical signal to the optical signal output from the optical source to determine a change in amplitude, phase, polarization, frequency, or some combination thereof.

14. The method of claim 12, further comprising:
directing the optical signal through a split in the micro-structured fiber optic cable to send the optical signal to a first branch and a second branch of the micro-structured fiber optic cable;
modulating the optical signal via the opto-electronic circuitry disposed in the first branch of the micro-structured fiber optic cable to generate a modulated optical signal in the first branch;
transmitting the optical signal through the second branch of the micro-structured fiber optic cable;
combining the modulated optical signal from the first branch with the optical signal from the second branch to form a combined signal via a junction along the micro-structured fiber optic cable; and
receiving the combined signal via the optical receiver.

15. The method of claim 12, further comprising directing an electrical signal from a downhole sensor into the opto-electronic circuitry to modulate the optical signal.

16. The method of claim 12, further comprising generating a signal indicative of the sensed downhole parameter through a functional material disposed within the micro-structured fiber optic cable to modulate the optical signal.

17. The method of claim 12, further comprising:
modulating a first factor of the optical signal based on a first sensed downhole parameter and modulating a second factor of the optical signal based on a second sensed downhole parameter to generate the modulated optical signal; and
estimating a value of the first sensed downhole parameter and the second sensed downhole parameter based on the modulated optical signal.

18. The method of claim 12, further comprising modulating the optical signal to amplify a sensor signal indicative of the sensed downhole parameter.

19. The method of claim 12, wherein modulating the optical signal comprises:
changing a permittivity, permeability, or geometry of a portion of the fiber optic cable via the opto-electronic circuitry; and
adjusting an amplitude, phase, polarization, or frequency of the optical signal moving through the fiber optic core based on the change in the portion of the fiber optic cable.

20. The method of claim 12, further comprising modulating the optical signal via the opto-electronic circuitry without deforming the glass in the micro-structured fiber optic cable.

21. The system of claim 6, wherein the optical source and the optical receiver are each disposed at a surface of the wellbore environment.

* * * * *